United States Patent [19]

Woodward et al.

[11] 4,433,113
[45] Feb. 21, 1984

[54] IONOMERS AS ANTISTATIC AGENTS

[76] Inventors: Fred E. Woodward, 200 Churchill Rd., West Palm Beach, Fla. 33405; Alice Hudson, 728 Kalmia Dr., Lake Park, Fla. 33403

[21] Appl. No.: 291,403

[22] Filed: Aug. 10, 1981

[51] Int. Cl.$^3$ ................................ C08F 8/32
[52] U.S. Cl. ................ 525/327.5; 525/327.6; 525/329.5; 525/329.6; 525/351; 525/379; 525/380; 252/546; 428/475.5
[58] Field of Search .......... 525/327.6, 329.5, 329.6, 525/351, 379, 380, 327.5; 524/819

[56] References Cited

U.S. PATENT DOCUMENTS

| | | | |
|---|---|---|---|
| 2,378,629 | 6/1945 | Hanford | 526/216 |
| 3,560,457 | 2/1971 | Hazen et al. | 528/496 |
| 3,729,452 | 4/1973 | Andress, Jr. et al. | 525/327.6 |
| 3,733,312 | 5/1973 | Deetman | 525/327.6 |
| 3,819,589 | 6/1974 | Fauke et al. | 525/327.6 |
| 3,852,249 | 12/1974 | Miyabe et al. | 525/329.6 |
| 3,925,328 | 12/1975 | Shibahara et al. | 525/329.6 |
| 3,936,537 | 2/1976 | Baskerville, Jr. et al. | 428/279 |
| 4,001,193 | 1/1977 | von Bonin et al. | 525/329.6 |
| 4,141,841 | 2/1979 | McDonald | 252/8.8 |
| 4,184,920 | 1/1980 | Blixt et al. | 435/19 |

*Primary Examiner*—Joseph L. Schofer
*Assistant Examiner*—B. Lipman

[57] ABSTRACT

New polymers are described which are copolymers of olefins and tetraalkyl ammonium carboxylates. They are insoluble in water, soluble in hydrocarbons and are antistatic agents.

8 Claims, No Drawings

IONOMERS AS ANTISTATIC AGENTS

BACKGROUND OF THE INVENTION

Field of the Invention

This invention is to new compositions of matter which it has not previously been possible to make and to a process for making them. The compositions, which are copolymers of quaternary ammonium carboxylates, are conductive and surface active and are useful in preventing charge or static generation on the surface of synthetic polymers.

There is a need in several technologies for a composition which will be conductive and thus prevent the generation of static charges on surfaces. These include: plastic flooring material as used in operating rooms; nylon, polyester, and poly-acrylonitrile fibers in which static charges cause problems in their production as well as discomfort when they are worn; polyethylene bottles and film which may pick up dirt after being rubbed; polystyrene which suffers from the same problem, as does also polyvinyl chloride and its copolymers.

Many antistatic agents have been proposed and are used to prevent static build-up on synthetic fabrics when they are washed and then dried in a home automatic hot air dryer. There is particular difficulty in doing this with a substance which can be added to a detergent or added to a washing machine while clothes are being washed.

Various attempts have been made to provide compositions which are effective laundry softeners and antistatic agents when added to the laundry wash cycle. For the most part they have relied on quaternary ammonium chlorides, methosulfates, modified in various ways to minimize the interaction between the quaternary ammonium salts and anionic components of the detergent. Thus Baskerville (U.S. Pat. No. 3,936,537) has mixed quaternary ammonium chlorides or sulfates with insoluble organic materials with a defined melting range and formed the mixture into prills with a specific range of size. McDanald (U.S. Pat. No. 4,141,841) has added water soluble agglomerating agents to the compositions of Baskerville as an improvement in their physical form which also improved their performance. Draper (U.S. Pat. No. 4,184,970) has replaced the organic agglomerating agent of McDanald with "anionic complexing agents" which may be organic or inorganic water soluble salts. The effectiveness of these compositions depends on the ability of the dispersion inhibitors, salts, agglomerating agents, and complexing agents to adequately maintain a physical separation between the quaternary ammonium sulfate or chloride and the other components of the detergent. Thus if the physical integrity of the softener particles is lost because of mechanical crushing or excessive heat in the wash cycle the quaternary ammonium salt can interact with anionic surfactants in the detergent with the subsequent loss of detergency, softening, and antistatic activity. It is thus a further object of our invention to provide an antistatic agent which is of uniform composition, does not depend on an artfully built up physical structure for its effectiveness, and which does not rely on the traditional quaternary ammonium sulfates or chlorides (or other halides) to provide antistatic activity.

SUMMARY OF THE INVENTION

We have discovered that copolymers of olefins and tetraalkyl ammonium maleates, fumarates, itaconates, and substituted maleates can be made by a unique process. The compositions are free of extraneous conterions. They are insoluble in water and soluble in hydrocarbons. Surprisingly they are very efficient and effective antistatic agents on synthetic fibers. The compositions are useful in clothes washing detergents to prevent static build-up on synthetic fibers.

DETAILED DESCRIPTION OF THE INVENTION

The ionomer compositions of this invention are the water insoluble conductive salts of copolymers of alpha olefins and dicarboxylic acids of 4 and 5 carbon atoms of the general structure

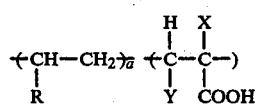

in which at least one-tenth of the —COOH groups exist as the ionized anion —COO<sup>−</sup> with a quaternary ammonium cation; the mole ratio of olefins (a) to dicarboxylic monomer is such that the combined weight of olefin for each dicarboxylic monomer unit is from at least 196 up to about 600; R is H or a hydrocarbon of 1 to 22 carbon atoms; and Y is H, and X is —CH$_2$COOH; or Y is —COOH, and X is H or CH$_3$; the quaternary ammonium cation may be (1) R$_1$R$_2$R$_3$R$_4$N$^+$ in which R$_1$ is alkyl or alkenyl containing about 10 to 22 carbon atoms and may be interrupted by O, S,

or phenyl, R$_2$ and R$_3$ are methyl, ethyl, propyl, hydroxyethyl, hydroxypropyl; or benzyl, and may be the same or different, and R$_4$ may be the same as R$_1$ or the same as R$_2$ or R$_3$; or (2) Condensation products of fatty acids containing from 12 to 22 carbon atoms with alkylene polyamines of the general structure:

where B is —CH$_2$CH$_2$—, —CH$_2$CH$_2$CH$_2$—,

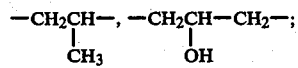

R$_7$ and R$_8$ are hydrogen, methyl, ethyl, benzyl or hydroxy alkyl, and P is zero, 1 or 2; in which the aminoamide or imidazoline is quaternized with a methyl halide, or dimethyl or diethylsulfate.

These condensates include but are not limited to compositions of the general structure:

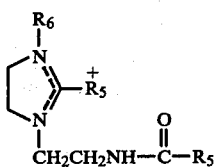

in which $R_5$ is alkyl containing 9 to 21 carbon atoms and $R_6$ is alkyl containing 1 to 3 carbon atoms.

Preferred compositions are the copolymers of $C_{16}$ to $C_{22}$ alpha olefins with quaternary ammonium maleate or itaconate. The maleates (or fumarates) and itaconates may exist as the fully ionized ion pair or as a mixture of the free acid and the ion pair form.

Even more preferred are copolymers in which the alpha olefins are straight chain. Particularly preferred is the ionomer with the general structure:

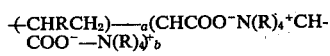

where R is a $C_{12}$ to $C_{22}$ straight chain alkyl, the ratio of a to b is essentially 1, and $N(R)_4{}^+$ is a quaternary nitrogen cation $^+NR_1R_2R_3R_4$ in which $R_1$ and $R_2$ are $C_{16}$ to $C_{18}$ straight chain alkyls; $R_3$ and $R_4$ are methyl or ethyl.

The preparation of copolymers of maleic anhydride with olefins is described in U.S. Pat. No. 2,378,629 (ethylene) and in U.S. Pat. No. 3,560,457 ($C_{12}$ to $C_{14}$ alpha olefins). In both patents it is clear polymerization must be carried out in solvent and can only be accomplished when using the solvent soluble anhydride form of the dicarboxylic acids, because as their acids or their salts they are insoluble in the olefin. It is surprising that the ionomers of our invention are hydrocarbon soluble and solvent soluble in their salt or ion-pair form. Because of this it is possible to mix a toluene (or other organic solvent) solution of olefin-anhydride copolymers with an aqueous mixture of quaternary ammonium salt and a base, and remove these from an aqueous solution of salt which is the anion of the quaternary ammonium salt and the cation of the base. The solvent may optionally be removed to leave a water slurry of the new ionomer which if desired can be removed by filtration and dried or the salt free product may be spray dried or it may be wet ground to a dispersion or paste of particles less than 80 or even 200 mesh. Alternatively the water and salt may be removed from a solvent suspension or solvent solution of the ionomer and the ionomer then applied as an antistatic agent in this form; or the solvent may be removed to give an anhydrous solvent free composition which may then be ground to a particle size of less than 40 mesh or less than 80 mesh.

The sodium salt of the copolymer of n-octadecene-1 and maleic anhydride may be formed by lengthy hydrolysis. However in one method of preparation of the dialkyl ($C_{16}$–$C_{18}$) dimethyl ammonium maleate copolymer the rate of hydrolysis of the anhydride moiety in water when mixed with 1 equivalent each of NaOH and $^+N(R)_4Cl^-$; a quaternary ammonium chloride, was found to be surprisingly rapid. Thus the quaternary ammonium salt is acting as a phase transfer agent to bring the hydroxyl ion of the base into reaction with the anhydride form of the polymer.

The preferred anhydride polymers, if the products are prepared from the anhydrides, melt below about 124° C. The 1:1 copolymer of maleic anhydride and n-tetradecene-1 which melts at 124° C. to 133° C. when mixed and heated with 1 equivalent each of $^+N(R)_4$ and NaOH remains as discreet particles, and reacts and dissolves much more slowly than the less water soluble (and lower melting) higher alkyl and more hydrocarbon like copolymers.

Thus, polymers which are copolymers of olefins and itaconic or maleic anhydride which are soluble in benzene or toluene at least 5% and which melt at 124° C. or less may be mixed with the quaternary ammonium compounds, $^+N(R)_4$ of this invention at an equivalent ratio of 2.0 $^+N(R)_4X^-$ (where $X^-$ is halide or sulfate) and 2.0 equivalents of an alkalie metal hydroxide per anhydride unit and there will result a copolymer ion pair essentially soluble in toluene and free from alkalie metal halide or sulfate, and surprisingly effective as an antistatic agent. The quaternary ammonium compounds having thus been found unexpectedly to serve as a powerful means of converting an otherwise water insoluble and inert or difficultly soluble (in water) polymeric carboxylate or anhydride into its ionic form, it is possible to prepare many useful conductive polymers by the combined action of a base, a quaternary ammonium ion, and water. Our invention thus includes the process of preparing an organic polymeric ionomer, free from extraneous inorganic ions consisting essentially of mixing together with heat polymeric anhydrides or their esters taken from the group consisting of the generalized structure (showing anhydrides in the free acid form);

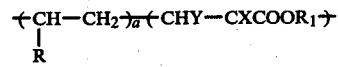

where R is H or a hydrocarbon residue of 1 to 22 carbon atoms; a is a number such that

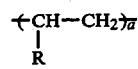

has a weight fraction of at least 196 up to about 600 for each mole of (CHY—CX $COOR_1$— in the copolymer; Y is H, and X is —$CH_2COOR_1$; or Y is —$COOR$ and X is H or $CH_3$; $R_1$ is H, or $C_1$ to $C_{18}$ alkyl; with the quaternary ammonium compounds $(R)_4N^+X^-$ taken from the group consisting essentially of (A) $R_1R_2R_3R_4N^+X^-$ in which $R_1$ is an alkyl of 12 to 22 carbon atoms which may be interrupted by O,S,

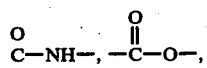

—$N^+R_3R_4X^-$, or phenyl, $R_3$ and $R_4$ are lower alkyl or lower hydroxy alkyl or benzyl and may be the same or different and $R_2$ may be the same as $R_1$, $R_3$ or $R_4$; $X^-$ is halide, sulfate, methosulfate or ethosulfate; and (B) condensation products of $C_{12}$ to $C_{22}$ fatty acids or esters with alkylene polyamines taken from the group consisting of

where B is —$CH_2CH_2$—, —$CH_2CH_2CH_2$—,

Other preferred quaternary ammonium maleates and itaconates are those derived from distearyl dimethyl ammonium chloride where the distearyl amine has been treated with hydrogen. However ditallow-di-methyl ammonium maleate may be preferred for reasons of economy and efficiency.

The methods of applying the compositions of this invention to synthetic fabrics includes adding them to a laundry detergent. In the case of those products which are hard and non-tacky this is accomplished by simply admixing the finely divided softener antistat with the powdered detergent or liquid detergent. Alternatively the detergent and softener antistat may be added separately to the wash. The chemical nature of the detergents into which these products are incorporated is not an essential feature of the present invention, since the compositions of this invention are insoluble and uncharged and therefore do not interact with detergent components. Those products of this invention which are liquids or pastes can be incorporated into a powdered detergent by dry mixing them with the builder components such as soda ash, phosphate salts, and sodium sulfate. Alternatively they may be put onto a fine particle substrate such as amorphous silica, kaolin or smectic clays, and zeolite, and admixed with the detergent or added separately to the wash. Also they can be emulsified with nonionic surfactants and added to liquid detergents, or the emulsions can be added as a separate product to the wash.

The compositions of this invention can be used in the rinse cycle by adding them as powders, either by themselves or on the surface of a small particle solid substrate, or by adding them as emulsions using emulsion techniques known in the art.

By adding suitable melting point modifiers, and other adjuvants, the compositions of this invention are effective as dryer applied softener antistats. Methods for employing softener compositions in dryer applied products and devices are known in the art, such as in U.S. Pat. No. 3,632,396 and are not an essential feature of the present invention.

The following non limiting examples illustrate the embodiment of this invention. Other aspects of this invention will be apparent to those skilled in the art.

EXAMPLE 1

The ion pair of the distearyl dimethyl ammoniun cation and the octadecene-maleate copolymer anion was prepared as follows. 4 g (0.05 mole) of 50% NaOH was added to 100 ml of water and 29.3 g (0.05 moles) of distearyl dimethyl ammonium chloride was dispersed in the mixture. It was heated to 85° C. and 8.8 g (0.05 moles of carboxylate) of 1:1 copolymer of octadecene and maleic anhydride was added as a powder. The mixture was stirred at 85° to 90° C. for 10 hours, during which the octadecene-maleic anhydride copolymer particles disappeared. The water phase gradually cleared and gelled particles of the ion pair formed. The product was separated by decanting the water. The product weighed 57.5 g and contained 36.1% water. The remaining water was removed by spreading the gelled product in a thin layer and passing air at room temperature across it. It was ground in a Waring Blender to a fine non-tacky powder.

The powdered product was tested as a wash cycle softener antistat under the following conditions:

5-7 lb of mixed fabrics including nylon, acrylic, polyester, cotton polyester blends, and cotton.

20 gal. water, approximately 100 ppm hardness, at 40° C.

Recommended levels of household laundry detergents, including both phosphate free and phosphate containing powders, and heavy duty liquids.

Automatic washers were 14 lb. heavy duty models.

Dryers were operated on a timed cycle which included a 5 minute "cool down".

The antistatic activity was rated:

| 0 | No evidence of static |
| + | Just discernable evidence of static |
| ++ | Noticeable reduction over detergent alone |
| +++ | No reduction in static |

The softening was measured on cotton terrycloth and was rated:

| 1 | Softness equal to distearyl dimethyl ammonium chloride applied in the rinse cycle. |
| 2 | Excellent softening but lacking "silkiness" of 1. |
| 3 | Discernably better than detergent alone. |
| 4 | Softness equal to detergent alone. |
| 5 | Worse than detergent alone. |

Typical results from the composition of this example are shown in table 1. The softening and antistatic activity of this composition is very good with all of the detergents tested.

TABLE 1

| Example A | Detergent | Static | Hand |
|---|---|---|---|
| 4.5 g | Powdered anionic with NTA | 0 | 1 |
| 2.5 | Powdered anionic with NTA | + | 2 |
| 4.5 | Liquid, non phosphate | + | 2 |
| 4.5 | Powdered nonionic | + | 2 |
| 4.5 | Powdered anionic, 6.1% Phosphorus | 0 | 1½ | the powdered detergents which are useful with the compositions of this invention are generally mixtures of 5 to 50% organic surfactants which may be anionic, amphoteric, or nonionic, with inorganic builders and water making up the balance. The builders are normally soda ash, sodium bicarbonate, zeolite, borax, sodium tripolyphosphate, sodium citrate, sodium polyacrylate, sodium polymaleate, and the like. Such detergent powders are described in U.S. Pat. No. 4,184,970 incorporated herein by reference.

EXAMPLE 2

The composition of example 1 was modified by reducing the ratio of distearyl dimethyl ammonium chloride to octadecene-maleic anhydride copolymer to ¾ and to ½ that of example 1, which was a molar ratio of quaternary ammonium to carboxylate of 1 to 1. The procedure of example 1 was used to prepare the compositions. They were both non-tacky powders. They were tested under the conditions of example 1, with the results shown in Table 2. The softening and antistatic activity of these lower ratios of quaternary ammonium to carboxylate remains very good.

TABLE 2

| Ratio of N+ to COO− | g added | Detergent | Static | Hand |
|---|---|---|---|---|
| ¾ | 6 | Anionic Powder with NTA | 0 | 1 |
| ½ | 3 | Anionic Powder | + | 2 |

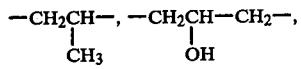

$R_7$ and $R_8$ are hydrogen, methyl, ethyl, benzyl, or hydroxy lower alkyl, p is zero, 1 or 2; and the condensation products contain at least two

or one imidazoline moiety, at least two fatty acid acyl groups, and at least one quaternary nitrogen group resulting from quaternization with lower alkyl halide, sulfate ester, or benzyl chloride; and the ratio of quaternary nitrogen salts of A or B to carboxyl groups in the copolymer is from 1 to 10 to 1 to 1; and adding to the heated mixture an amount of alkalie metal base essentially equal in equivalents to the number of equivalents of quaternary nitrogen groups, separating from said mixture by filtration, or by extraction with water an amount of alkali metal salt about equal to the amount of alkalie metal hydroxide added.

Alternatively the alkalie metal hydroxide may be added in excess of the quaternary ammonium anion. If hydrocarbon or organic solvent is present there will result compositions suitable for use as an additive to waxes and polymers which is a solution or dispersion in an organic solvent or hydrocarbon of an ionomer having the general structure

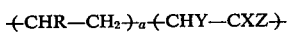

where R is hydrogen or hydrocarbon radical group from $C_1$ to $C_{22}$ and a is an integer such that the unit combining weight of $-(-CHR-CH_2-)_a$ is at least 196; Y is H and X is $CH_2COOH$ or $CH_2COO^-M^+$; or Y is $COOH$ or $COO^-M^+$ and X is H or $CH_3$; Z is —COOH or —$COO^-M^+$; M is an alkali metal cation or is $^+N(R)_4$ a quaternary cation described above and at least 10% of the number of carboxyl groups are —$COO^{-+}N(R)_4$.

The anhydride groups of the polymers can be partially prehydrolyzed with 0.5 moles of water per mole of anhydride and the remaining anhydride groups left intact, or may be hydrolyzed completely.

The compositions are soluble in mixed aromatic solvents, hydrocarbons with an aniline point of 150 or less, in oxygenated solvents such a methyl amylketone, cellosolve acetate, and the like. Solution in hydrocarbons may be readily emulsified by the addition of water beyond that required for hydrolysis. The compositions, if prepared in mineral oil may similarly by emulsified.

Similarily compositions useful as antistatic agents can be prepared from copolymers of alpha olefins and maleic or itaconic anhydride which have been converted to the corresponding half-esters or partial half esters.

Other suitable polymers for which this procedure is appropriate include styrene-maleic anhydride copolymers with a ratio of about 3 styrene units to 1 anhydride unit such as SMA 3000A from Arco Chemical Company which has a softening range of 115°–130° C.

The 1:1 copolymer of tetradecene-1 and maleic anhydride has a softening point of 124°–133° C. and a solubility in benzene of 1–5%. It is marginally suitable in the compositions of this invention and for the process by which the anhydrides are converted to the water insoluble quaternary ammonium ion pair copolymers.

Other methods of preparation are made possible by the unusual properties of these new compositions. Thus the anhydrous molten polymeric anhydride polymers may be mixed with the quaternary ammonium compounds as a slurry or dispersion or as a solution without added solvent or in an organic solvent, or in mixtures of organic solvent and water. The polymeric anhydrides will dissolve partially or wholly in the quaternary ammonium compounds of this invention at temperatures near or above their melting points. These solutions may be cooled to give new compositions which can be hydrolyzed at a later time to form the salt-free ion pairs. These compositions are useful in applications where the anhydride will subsequently hydrolyze and form the ion pair with the quaternary ammonium compound. Alternatively water in a stoichiometric amount can be added to hydrolyze the anhydride and make the quaternary ammonium salt with the formation of the acid of the counterion of the quaternary ammonium compound added. The acid may be removed by washing, with or without neutralization or in the subsequent use of the anhydrous material as it comes in contact with water where the acid or the salt is spontaneously rejected leaving the salt free ion pair. The use of an alkalie metal base is preferred.

It will be recognized by those skilled in the art that with the recognition of the energetics of the co-solving of the quaternary ammonium cation with the polymers of this invention, that many variations in their preparation, physical form, and use are possible.

The insoluble ion pair of the polycarboxylate anion and the quaternary ammonium cation is preferably formed by mixing a water slurry or solution of a salt of the polycarboxylate anion which ionizes in water with a water solution of a salt of the quaternary ammonium cation which also substantially ionizes in water. The insoluble ion pair separates as an organic phase containing less than about 60% water and can be separated from the water phase containing most of the counterion salt by standard separation techniques. Suitable counterions for the polycarboxylate anion include $Na^+$, $K^+$, $NH_4^+$, triethanol amine, diethanol amine, monoethanol amine and the like. Suitable counterions for the quaternary ammonium cation include $CL^-$, $Br^-$, $I^-$, methosulfate, ethosulfate, and the like. The remaining water in the organic phase may be removed by standard methods such as vacuum stripping, drum drying, use of a thin film evaporator, and the like.

Examples of suitable quaternary ammonium cations include dihydrogenated tallow dimethyl ammonium, distearyl dimethyl ammonium, dicocodimethyl ammonium, stearyl trimethyl ammonium, cetyl trimethyl ammonium, myristyl trimethyl ammonium, lauryl trimethyl ammonium, stearyl bis-2-hydroxyethyl methyl ammonium, tridecyloxypropyltrimethyl ammonium, dihydrogenated tallow imidazolinium, and the like.

Preferred quaternary ammonium compounds are those in which the alkyl radical is produced from an alpha olefin by the addition of HBr to the double bond followed by condensation with dimethyl amine and quaternization with methyl chloride, bromide or diethyl sulfate. These give compositions which are normally stable and present fewer problems because of the absence of unsaturation.

TABLE 2-continued

| Ratio of N+ to COO− | g added | Detergent | Static | Hand |
|---|---|---|---|---|
| ⅓ | 6 | Anionic Powder with NTA | 0 | 1 |
| ⅔ | 4.5 | Anionic Powder with NTA | + | 2 |
| ⅓ | 4.5 | Anionic Powder −6.1% P | 0 | 2 |

The level of the antistatic agents of this invention on synthetic fibers and fabrics are surprisingly low. Thus 3.0 g of the composition of Example 1 reduces static formation significantly when applied by the relatively inefficient method of adding it to a detergent which was then used to wash a mixed load of fabric which contained:

| 220 g | nylon |
|---|---|
| 550 g | acrylic |
| 358 g | polyester |
| 606 g | cotton (fabric) |
| 238 g | cotton (terry) |
| 326 g | permanent press |

Thus 0.2% of the antistatic composition was added on the total weight of the fabric. The cotton (terry) towels were observed to have a surprisingly pleasant soft feel, indicating that more than a proportionate amount of the composition ended up on the cotton and permanent press cloth. Thus the amount of antistatic agent on the smooth nylon and polyester fabric was significantly less than 0.2%, (it is estimated to be about 0.01% or less) and yet the amount of static on these fabrics was very low, and dissipated quickly.

EXAMPLE 3

The thermal stability of the composition of Example 1 was compared with that of distearyl dimethyl ammonium chloride (using a purified grade of 100% material, Arosurf TA-100 from Ashland Chemical Company). As a further comparison there was included a sample of euricamide. Three 1 g samples in aluminum dishes were heated simultaneously on a hot plate to their smoke points or decomposition points.

| | Observation | | |
|---|---|---|---|
| Time | TA-100 | Example 1 | Euricamide |
| 2 min | melting | | melting |
| 4:30 | | starting to sinter | |
| 5:30 | | | melted |
| 7:00 | melted | | |
| 8:00 | smoking | | |
| 9:00 | | | smoking |
| 10:00 | decomposing rapidly | | |
| 10:30 | | smoking | |

Without wishing to limit the scope of this invention compositions in which the polymers of this invention may be used as antistatic agents include floor polish, polyethylene sheet, nylon fabric and nylon yarn including nylon carpet yarn. Because of the good solubility of the compositions in hydrocarbons they may be mixed with or dissolved in waxes. The solubility of the product of Example 1 in water is essentially zero as determined by its failure to reduce surface tension.

A composition which 25% of the carboxyl groups are in the form —COO$^-$ $^+$N(R)$_4$ and the remainder in the form —COOH was prepared by heating together at 60°–80° C. a mixture of 18.9 parts Adogen 442 (0.025 moles of ditallow dimethyl ammonium chloride)

10.0 parts of 10% NaOH (0.025 moles)

17.5 parts of PA-18 (the copolymer of maleic anhydride and octadecene-1)

in 50 parts of water for five hours. A water layer was then allowed to separate. The remaining organic layer contained 23% water. It was dried to 7% water content and ground into small particles which were screened to give fractions of −20+40 mesh, −40+80 mesh and −80 mesh. These fractions were all suitable as additives to plastics such as nylon and polyvinyl acetate. The fraction −40+80 was preferred as an additive to detergents or directly as the powder to a washing machine along with clothes and detergent. The −80 mesh fraction was preferred for addition to a liquid detergent where it remained suspended.

EXAMPLE 5

A composition effective as an antistatic agent in floor polishes, as a coating on plastics, and as a detergent additive, and also suitable for adding to a clothes dryer to prevent static build up on synthetic fabrics was prepared by mixing 14.7 parts of the 1:1 copolymer of tetradecene-1 and maleic anhydride 50.0 parts water and 40.0 parts of 10% NaOH which after one day was a milky dispersion. To this was added 75.4 g of Adogen 442 (75%)

and after heating and stirring, then allowing it to stand hot, separated to give the quaternary ammonium polymer containing 54% water.

The composition (21.5 parts) was mixed with 30 parts of polyethylene glycol 4000 and applied warm to sheets of formed urethane and to sheets of non-woven paper to give approximately 1.5 to 5.0 g of the antistatic composition per each sheet whose dimensions ranged from 2×6 inches to 8×11 inches. When added to a load of clothes drying in an automatic dryer they prevented the build-up of static.

The polymeric ion pair was also dried and ground to give a powder which could be similarly dispersed in polyethylene glycol or in other water soluble or insoluble matrices.

EXAMPLE 6

The composition of Example 5 was similarly prepared in toluene from 14.7 parts PA-14 from Gulf 54. parts toluene 58.8 parts of Arosurf TA-100 (100% active distearyl dimethyl ammonium chloride)

The mixture was heated to 60° C. and after adding 20 parts more toluene and stirring for 10 hours the mixture was a viscous solution. To this was added 0.90 ml. of water (1 mole per mole of anhydride groups). The solution turned hazy; then immediately became clear. Additional water could be added without the solution becoming hazy. To the hydrolyzed product was added 8.0 parts of 50% sodium hydroxide and 40 parts of water to form a very stable emulsion.

EXAMPLE 7

Typical powdered detergent formulations were prepared:

|  | A | B | C |
|---|---|---|---|
| Neodol 25-9 | 10 | 10 | 15 |
| Sodium dodecyl benzene sulfate |  | 15 |  |
| Sodium $C_{13}$-$C_{15}$ alcohol sulfate |  |  | 5 |
| Soda ash | 79 |  | 15 |
| Sodium silicate | 6 | 6 | 4 |
| Sodium tripolyphosphate |  | 45 | 22 |
| Borax |  |  | 10 |
| Carboxy methyl cellulose | .5 | .75 | 1.0 |
| Methocel | .5 |  | .5 |
| Product of Example 1 | 4.0 | 6.0 | 3.0 |
| Sodium sulfate |  | 11.25 |  |
| Water |  | 6.0 | 4.5 |
| Zeolite |  |  | 20 |

When tested as detergents they all gave excellent detergency, the cotton (terry) towels had a soft pleasant hand, and there was essentially no static generated on the synthetic fabrics when the wash was dried. A duplicate of formulation A was prepared containing, instead of the product of Example 1, 4% of Arosurf TA-100. The detergency and hand were both poor, and strong static was developed when the clothes were dried.

Other surfactants may be used that are nonionic, anionic, or amphoteric and the level of surfactant in the powder may vary from none (in which case the powder is an additive for the wash) up to about 50%. Other builders may be used including polycarboxylic acids of MW about 600 to about 50,000, nitrilo triacetic acid, citric acid, $C_2$ to $C_6$ dicarboxylic acids and their alkalie metal salts, along with foam control agents, brighteners, perfume and color.

What is claimed is:

1. An ionomer composition comprising the water insoluble conductive salts of copolyers of alpha olefins and dicarboxylic acids of 4 and 5 carbon atoms of the general structure

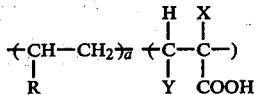

in which at least one-tenth of the —COOH groups exist as the ionized anion —COO$^-$ with a quaternary ammonium cation; the mole ratio of olefins (a) to dicarboxylic monomer is such that the combined weight of olefin for each dicarboxylic monomer unit is from at least 196 up to about 600; R is H or a hydrocarbon of 1 to 22 carbon atoms; and Y is H, and X is —CH$_2$COOH; or Y is —COOH, and X is H or CH$_3$; the quaternary ammonium cation is (1) $R_1R_2R_3R_4N^+$ in which $R_1$ is alkyl or alkenyl containing about 12 to 22 carbon atoms and may be interrupted by O, S,

or phenyl, $R_2$ and $R_3$ are methyl, ethyl, propyl, hydroxyethyl, hydroxypropyl; or benzyl, and may be the same or different, and $R_4$ may be the same as $R_1$ or the same as $R_2$ or $R_3$; or (2) Condensation products of fatty acids containing about 12 to 22 carbon atoms with alkylene polyamines or hydroxyalkyl amines of the general structure:

where B is —CH$_2$CH$_2$—, —CH$_2$CH$_2$CH$_2$—,

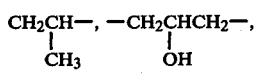

$R_7$ and $R_8$ are hydrogen methyl, ethyl, benzyl or hydroxy alkyl, and P is zero, 1 or 2; in which the amino-amide or imidazoline is quaternized with a methyl halide, or dimethyl or diethylsulfate.

2. The composition of claim 1 in which R is an alkyl of 14 to 22 carbon atoms and a is from 1 to 2.

3. The composition of claim 1 which is in a particulate form that is smaller than 40 mesh.

4. The composition of claim 1 in which at least one-half of the carboxyl groups exist as —COO$^-$ $^+$N(R)$_4$ and the composition is essentially free of inorganic anions and cations; and $^+$N(R)$_4$ is a quaternary ammonium cation of claim 1.

5. The composition of claim 1 in which essentially all carboxylate groups exist as —COO$^-$ $^+$N(R)$_4$ and which is essentially free of all inorganic anions, cations and water.

6. A composition suitable for use as an additive to waxes and polymers which is a solution or dispersion in an organic solvent of an ionomer having the general structure

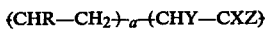

where R is hydrogen or hydrocarbon radical group from $C_1$ to $C_{22}$ and a is an integer such that the unit combining weight of $-(CHR-CH_2-)_a$ is at least 196; Y is H and X is CH$_2$COOH or CH$_2$COO$^-$M$^+$; or Y is COOH or COO$^-$M$^+$ and X is H or CH$_3$; Z is —COOH or —COO$^-$M$^+$; M is an alkalie metal cation or is $^+$N(R)$_4$ a quaternary cation of claim 1 and at least 10% of the number of carboxyl groups are —COO$^-$ $^+$N(R)$_4$.

7. The process of preparing an organic polymeric ionomer, essentially free of inorganic ions consisting essentially of mixing together with heat polymeric esters, acids or anhydrides which when hydrolyzed are of the structure:

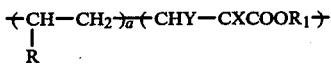

where R is H or a hydrocarbon residue of 1 to 22 carbon atoms; a is a number such that

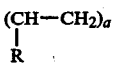

has a weight fraction of at least 196 up to about 600 for each mole of CHY—CXOOR1 in the copolymer; Y is H, and X is —CH$_2$COOR$_1$; or Y is —COOR and X is H or CH$_3$; $R_1$ is H, or $C_1$ to $C_{18}$ alkyl; with the quaternary ammonium compounds (R)$_4$N$^+$X$^-$ taken from the group consisting essentially of (A) $R_1R_2R_3R_4N^+X^-$ in which $R_1$ is an alkyl of 12 to 22 carbon carbon atoms which may be interrupted by O, S,

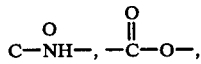

$-N^+R_3R_4X^-$, or phenyl, $R_3$ and $R_4$ are lower alkyl or lower hydroxy alkyl or benzyl and may be the same or different and $R_2$ may be the same of $R_1$, $R_3$ or $R_4$; $X^-$ is halide, sulfate, methosulfate or ethosulfate; and (B) condensation products of $C_{12}$ to $C_{22}$ fatty acids or esters with alkylene polyamines taken from the group consisting of

where B is $-CH_2CH_2-$, $-CH_2CH_2CH_2-$,

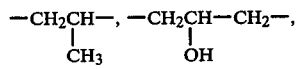

$R_7$ and $R_8$ are hydrogen, methyl, ethyl, benzyl, or hydroxy lower alkyl, p is zero, 1 or 2; and the condensation products contain at least two

or one imidazoline at least two fatty acid acyl groups, and at least one quaternary nitrogen group resulting from quaternization with a lower alkyl halide, sulfate ester, or benzyl chloride; and the ratio of quaternary nitrogen salts of A or B to carboxyl groups in the copolymer is from 1 to 10 to 1 to 1; adding to the heated mixture an amount of alkalie metal hydroxide essentially equal in equivalents to the number of equivalents of quaternary nitrogen groups, separating from said mixture by filtration, or by extraction with water an amount of alkalie metal salt about equal to the amount of alkalie metal hydroxide added.

8. The process of claim 7 in which the copolymer which is the one to one copolymer of octadecene-1 with maleic anhydride and the quaternary ammonium compound which is distearyl dimethyl ammonium chloride are mixed at a ratio of quaternary ammonium compound to anhydride groups of 2 to 1) (and to carboxyl groups of 1 to 1) with an amount of alkalie metal hydroxide essentially equivalent to the moles of quaternary nitrogen salts present in an amount of water adequate to allow the mixture to be stirred; and separating from the product in a water solution of an amount of neutral alkalie metal salt essentially equivalent to the amount of quaternary ammonium salt added.

* * * * *